3,473,937
METHOD OF STRENGTHENING $Na_2O-Al_2O_3-SiO_2$ GLASS-CERAMICS WITH LEADED GLAZES AND PRODUCT
Megumi Tashiro, Kyoto, Masamichi Wada, Otsu, Toshio Yamanaka, Kyoto, and Kenichi Tani, Otsu, Japan, assignors, by mesne assignments, to Owens-Illinois, Inc., a corporation of Ohio
No Drawing. Filed Jan. 21, 1966, Ser. No. 522,034
Claims priority, application Japan, Jan. 27, 1965, 40/4,381; Feb. 12, 1965, 40/8,060
Int. Cl. C04b 35/18; C03c 5/02, 3/04
U.S. Cl. 106—39                     2 Claims

ABSTRACT OF THE DISCLOSURE

A glass-ceramic article of the $SiO_2-Al_2O_3-Na_2O-ZrO_2$-ZnO and/or MgO system having a vitreous glaze thereon, which glaze has a coefficient of thermal expansion of 20 to 60% of the glass-ceramic and the glaze is of the $SiO_2$-$B_2O_3$-PbO-alkali metal oxide system. A method for making the glass-ceramic article is also disclosed.

---

This invention is concerned with a method for strengthening glass-ceramics by applying on the glass-ceramic, which is made up largely of $ZrO_2$, $SiO_2$, $Al_2O_3$, $Na_2O$, ZnO, and MgO, a glaze which is composed mainly of $SiO_2$, $B_2O_3$, PbO and alkali metal oxides ($Li_2O$, $Na_2O$, $K_2O$) and has a coefficient of thermal expansion per ° C. over the range 30–380° C. that is 20 to 60% less than that of the glass-ceramic.

The inventors have found that a composite ceramic body made by applying a proper glaze on a proper glass-ceramic base is mechanically stronger than the glass-ceramic base itself, if the glass-ceramic base and the glaze are selected from the following range of chemical compositions: the glass-ceramic base contains, by weight, 45–57 parts of $SiO_2$, 29–38 parts of $Al_2O_3$, 13–22 parts of $Na_2O$ as essential major components. In addition to the major components, 0.5–5 parts of $ZrO_2$ and 1–10 parts of ZnO or MgO or a mixture thereof (based on 100 parts of the recited major components) are included as essential components of the glass and the glass-ceramic made therefrom by thermal in situ crystallization. At least 95% of the total weight consists of the essential components. The glaze consists essentially of, by weight, 40–70 parts $SiO_2$, 5–30 parts of $B_2O_3$, 10–30 parts of PbO and 2–20 parts of alkali metal oxides ($Li_2O$, $Na_2O$, $K_2O$), and these components constitute at least 80% of the total weight of the glaze. Also, the glaze should have an expansion coefficient which is 20–60% less than that of the base glass-ceramic on which the glaze is applied.

Although the Patent Showa 39/19,978 describes a method to prepare a composite body of a glass-ceramic and a glaze, the method is concerned, as shown in the claims of the patent specification, with a manufacturing method of mixed ceramics mainly for ceramic ware for table or similar uses; the material is characterized in that a semicrystalline glass ceramic base and an intermediate layer (which contains alkali metal oxide, such as $Li_2O$, $Na_2O$, or $K_2O$ or their combination, 16% by weight or less and tend to combine with the crystals) form an amorphous glaze which combines with the base ceramics. By this patent method, a mechanically strong composite body was sometimes obtained, but not always. Therefore, the method does not include necessary conditions to prepare a mechanically strong composite body by applying a glaze on the glass-ceramics. This invention, however, is concerned with a method for strengthening the base glass-ceramics by applying a glaze, and includes the necessary conditions for the strengthening of the glass-ceramic. In another aspect, the invention is concerned with a new glazed glass-ceramic product.

TABLE 1

| Example | 1 | 2 | 3 |
|---|---|---|---|
| Parts by weight: | | | |
| $SiO_2$ | 50 | 50 | 50 |
| $Al_2O_3$ | 33 | 30 | 34 |
| $Na_2O$ | 17 | 20 | 16 |
| $ZrO_2$ | 1 | 2 | 2 |
| $TiO_2$ | 3 | 3 | 3 |
| ZnO | 2 | | |
| MgO | | 6 | |
| BaO | | | 6 |
| Bending Strength (kg./cm.$^2$): | | | |
| Glass ceramic base | 1,950 | 1,130 | 1,675 |
| Glazed material | 3,750 | 2,375 | 1,665 |
| Expansion coefficient $\sim 10^{17}$ (30–386° C.)/° C.: | | | |
| Glass ceramics | 118 | 125 | 115 |
| Glaze (A of Table 4) | 68.7 | 68.7 | 68.7 |
| Difference in the expansion coefficient between the glaze and the glass ceramic base (percent) | 42 | 45 | 41 |

Table 1 shows the composition of the glass-ceramic base. This table clearly shows that the presence of ZnO or MgO is extremely important to the strengthening effect of the glazing. It is shown in Examples 1 and 2, which contain ZnO and MgO in the glass-ceramic respectively, that the mechanical strength became much greater after the glazing than that of the unglazed base. In Example 3, which did not contain ZnO or MgO in the glass ceramic base, the increase in the mechanical strength by glazing was not observed, although the difference in the expansion coefficient between the glass ceramic base and the glaze was of a similar order to those of Examples 1 and 2. Example 3 belongs to the method referred to within the claims contained in Patent No. Showa 39/19,978. This means that the methods described in the patent do not necessarily include essential conditions for strengthening the glass-ceramic base.

The present invention is concerned with a process in which conditions necessary to strengthen the glass-ceramic base by glazing are fulfilled. Further practical examples are shown below.

TABLE 2

| Ex. No. | Glass ceramic No. | Glaze | Bending strength (kg./cm.$^5$) | | Expansion Coefficient ($\times 10^{-7}$, 30–280° C.) | |
|---|---|---|---|---|---|---|
| | | | Glass-ceramic | Glazed material | Glass-ceramic | Glaze material |
| 4 | 1 | A | 1,175 | 2,870 | 119.0 | 68.7 |
| 5 | 2 | A | 985 | 2,875 | 126.5 | 68.7 |
| 6 | 3 | A | 1,920 | 3,750 | 118.8 | 68.7 |
| 7 | 4 | A | 1,130 | 2,375 | 125.4 | 68.7 |
| 8 | 5 | A | 1,810 | 2,875 | 118.0 | 68.7 |
| 9 | 6 | A | 1,900 | 3,740 | 109.0 | 68.7 |
| 10 | 7 | A | 1,505 | 3,360 | 124.3 | 68.7 |
| 11 | 3 | B | 1,920 | 4,445 | 118.8 | 76.8 |
| 12 | 3 | C | 1,920 | 3,755 | 118.8 | 90.4 |
| 13 | 8 | A | 2,115 | 3,700 | *110–130 | 68.7 |

*Estimated.

TABLE 3

| Glass-ceramic No. | $SiO_2$ | $Al_2O_3$ | $Na_2O$ | $ZrO_2$ | ZnO | MgO | $TiO_2$ | BaO | $K_2O$ |
|---|---|---|---|---|---|---|---|---|---|
| 1 | 47 | 35 | 18 | 4 | 8 | | | | |
| 2 | 50 | 30 | 20 | 5 | | 10 | | | |
| 3 | 50 | 33 | 17 | 1 | 2 | | 3 | | |
| 4 | 50 | 30 | 20 | 2 | | 6 | 3 | | |
| 5 | 50 | 34 | 16 | 1 | 2 | 2 | 3 | | |
| 6 | 50 | 34 | 16 | 1 | 2 | | 3 | 2 | |
| 7 | 52 | 32 | 16 | 2 | | 6 | 3 | | 2 |
| 8 | 51 | 32 | 17 | 1 | 2 | | 3 | | |

TABLE 4

| Glaze | $SiO_2$ | $B_2O_3$ | PbO | $Al_2O_3$ | $Na_2O$ | $K_2O$ | MgO | CaO |
|---|---|---|---|---|---|---|---|---|
| A | 50 | 10 | 24 | 5 | 7 | 2 | 2 | |
| B | 50 | 10 | 21 | 5 | 7 | 5 | | 2 |
| C | 50 | 10 | 18 | 5 | 10 | 5 | | 2 |
| D | 44 | 10 | 24 | 5 | 7 | 2 | 2 | 6 |

In making the glasses for the glass-ceramic and for the glazes herein, it will be understood that standard batch materials can be used, such as silica sand ($SiO_2$), alumina ($Al_2O_3$), soda ash (for $Na_2O$), zircon (for $ZrO_2$, $SiO_2$), $TiO_2$, potash (for $K_2O$), ZnO, $BaCO_3$ (for BaO), $Li_2CO_3$ (for $Li_2O$), periclase (for MgO), aluminum or sodium phosphate (for $P_2O_5$), boric acid, borax or anhydrous $B_2O_3$, $CaCO_3$ (for CaO), and red lead (for PbO).

The glass batch materials were mixed to result in the chemical composition shown in Table 3 and in Table 1. The mixture of each batch was heated at 1550° C. for 8 hours in an electric furnace; then the melt was shaped in the form of a rod approximately 5 mm. in diameter. This glass sample was heated at 800° C. for two hours, then raised to 1100° C. at a rate of 5° C./min. Then by heating further at 1100° C. for two hours, it was converted into a glass-ceramic. Then it was cooled in the furnace.

The glaze slip was prepared as follows with the chemical compositions shown in Table 4. The glass mixture was heated at 1300–1400° C. for 4–5 hours in a gas furnace and the molten material was immersed in water to make frit. This was placed in a pot-mill together with an appropriate amount of water and a peptizing agent and ground to pass through 200 mesh. This glaze slip thus prepared was painted on the ceramic base in the usual manner and dried. Then it was heated at 1100° C. for two hours to complete the glazing. The glaze layer was adjusted to become 0.1–0.2 mm. thick.

The bending strength shown in Tables 1 and 2 for the glass-ceramic and the glazed glass-ceramic was measured as follows: a rod specimen 50 mm. long and 5 mm. in diameter was tested with a strength tester which has a span of 40 mm. and at the middle of the span a load is applied. The results presented in Tables 1 and 2 show that the bending strength of the glass-ceramic has been increased considerably by the glazing, except in the case of Example 3 of Table 1.

Example 14

Glass rods were made as described for the other examples but the composition of the glass was as follows.

Component: Parts by weight
$SiO_2$ ------------------------------------- 54
$Al_2O_3$ ------------------------------------ 29.5
$Na_2O$ ------------------------------------- 16.5
$ZrO_2$ -------------------------------------- 1
$TiO_2$ -------------------------------------- 3
ZnO ---------------------------------------- 2.5
PbO ---------------------------------------- 0.5
$P_2O_5$ -------------------------------------- 0.5

Total ---------------------------------- 107.5

The rods were heat treated by holding at 750° C. for two hours, then raising the temperature at a rate of 5° C./min. to 1000° C. and holding at that temperature for two hours. The thermally crystallized rods were then allowed to cool in the furnace to room temperature. They had a bending strength or modulus of rupture (average of a number of samplings) of 1210 kg./cm.$^2$ and a linear coefficient of thermal expansion (30–380° C.) of $119 \times 10^{-7}/°$ C.

As in the other examples, a glaze slip was applied, but glaze D in Table 4 was used. After drying the composite was heated at a rate of 5° C./min. to 1000° C. where it was held for two hours, then allowed to cool in the furnace to room temperature. The modulus of rupture of the glazed glass-ceramic was 3400 kg./cm.$^2$. The thermal expansion of glaze composition D is $73 \times 10^{-7}/°$ C. (30–380° C.).

The reasons that the ranges of chemical composition of the necessary components ($SiO_2$, $Al_2O_3$, $Na_2O$, $ZrO_2$, ZnO and MgO) are limited as described above is as follows: as to the $ZrO_2$, at less than 0.5 part difficulties were encountered in efforts to obtain a finely crystallized glass-ceramic and at 5 parts or more the liquidus temperature of the glass becomes very high and the formation of glass becomes difficult. Therefore, $ZrO_2$ should be in a range of 0.5–5 parts. As to the $SiO_2$, at 45 parts or less the chemical resistance of the glass-ceramic is poor, and at 57 parts or more the crystallization of the glass by reheating was difficult to accomplish. Therefore, the $SiO_2$ content should be in a range of 45–57 parts. At 29 parts of $Al_2O_3$ or less, finely crystallized glass-ceramic was not obtained easily, and at 38 parts or more the liquidus temperature of the glass became very high. Therefore, the $Al_2O_3$ should be in a range of 29–38 parts. At 13 parts of $Na_2O$ or less the crystallization of the glass by the reheating was difficult, and at 22 parts or more finely crystallized glass-ceramic was not obtained easily. Therefore, the $Na_2O$ should be in a range of 13–22 parts. When the ZnO and/or MgO content was less than 1 part or more than 10 parts, a finely crystalline glass-ceramic was not obtained easily; also with less than 1% the glaze will not effectively strengthen the glass-ceramic. Therefore, the ZnO and/or MgO content should be in a range of 1–10 parts. When the total weight of $SiO_2$, $Al_2O_3$, $Na_2O$, $ZrO_2$ and ZnO and/or MgO is below 95%, deformation due to softening is considerable in the recrystallization process. Therefore, the total of $SiO_2$, $Al_2O_3$, $Na_2O$, $ZrO_2$, ZnO and/or MgO should be more than 95%.

The reasons that the chemical composition of the glaze in this invention is limited to the ranges mentioned above are to increase the strength of the glass-ceramic by creating a compressive stress in the glaze layer, and also to bring the softening or melting point of the glaze at least below 1150° C. so that the glass-ceramic base does not deform in the glazing process, and also to give enough chemical resistance to the glaze layer for practical use. At 40 parts or less of $SiO_2$, or at 30 parts or more of $B_2O_3$, or at 30 parts or more of PbO, the chemical resistance of the glaze was poor. It was difficult to obtain a glaze having a lower glazing or curing temperature than the softening temperature of the glass-ceramic base at 70 parts or more of $SiO_2$, 5 parts or less in $B_2O_3$, and 10 parts or less in PbO. Therefore, those concentration ranges were determined for $SiO_2$ 40–70 parts, for $B_2O_3$ 5–30 parts and for PbO 10–30 parts. At 2 parts or less in alkali metal oxides (total of $Li_2O$, $Na_2O$ and $K_2O$) the glazing temperature exceeds the softening temperature of the ceramic base, and at 20 parts or more the expansion coefficient of the glaze was not proper to keep the difference of 20–60% from that of the ceramic base. Therefore, the concentration range of the total alkali metal oxides ($Li_2O$, and $Na_2O$ and $K_2O$) should be within 2–20 parts. In the case where the sum of $SiO_2$, $B_2O_3$, PbO and alkali metal oxides is less than 80%, the expansion coefficient, the glazing temperature and the chemical composition do not fulfill the requirements described above. Therefore, the total of $SiO_2$, $B_2O_3$, PbO and alkali metal oxides must be at least 80% of the total weight.

According to the method described in the present invention, a glazed glass-ceramic having a large strength can be produced. Such products are suitable for use as tableware as well as industrial materials which need extra strength.

What is claimed is:
1. A composite article comprising (1) a thermally crystallized glass having a composition consisting essentially of, in parts by weight:
45–57 $SiO_2$
29–38 $Al_2O_3$

13-22 Na$_2$O
and, based on 100 parts SiO$_2$ plus Al$_2$O$_3$ plus Na$_2$O,
    0.5–5 ZrO$_2$ and
    1–10 of a member selected from the group consisting of ZnO, MgO and a mixture thereof
where said SiO$_2$+Al$_2$O$_3$+Na$_2$O+ZrO+ZnO+MgO is at least 95 weight percent of said composition, and (2) a glaze on the surface of said crystallized glass under compressive stress and having a composition consisting essentially of, in parts by weight, 40–70 SiO$_2$, 5–30 B$_2$O$_3$, 10–30 PbO, and 2–20 total alkali metal oxides selected from Li$_2$O, Na$_2$O and K$_2$O, the coefficient of thermal expansion of said glass being 20–60% less than that of said thermally crystallized glass.

2. A method of making a strengthened glass-ceramic article which comprises providing a glass-ceramic article resulting from thermal crystallization of a glass article of a composition consisting essentially of, in parts by weight,
    45–57 SiO$_2$
    29–38 Al$_2$O$_3$
    13–22 Na$_2$O
and, based on 100 parts SiO$_2$ plus Al$_2$O$_3$ plus Na$_2$O,
    0.5–5 ZrO$_2$ and
    1–10 of a member selected from the group consisting of ZnO, MgO and a mixture thereof
where said SiO$_2$+Al$_2$O$_3$+Na$_2$O+ZrO$_2$+ZnO+MgO is at least 95 weight percent of said composition, and applying thereto a vitreous glaze having a coefficient of thermal expansion 20 to 60% of that of the glass-ceramic and having a composition consisting essentially of, in parts by weight, 40–70 SiO$_2$, 5–30 B$_2$O$_3$, 10–30 PbO, and 2–30 total alkali metal oxides selected from Li$_2$O, Na$_2$O and K$_2$O.

References Cited
UNITED STATES PATENTS

| | | | |
|---|---|---|---|
| 2,467,114 | 4/1949 | Deyrup | 106—49 |
| 3,146,114 | 8/1964 | Kivlighn | 106—39 |
| 3,252,811 | 5/1966 | Beall | 106—39 |
| 3,272,610 | 9/1966 | Eppler et al. | 106—39 X |
| 3,282,712 | 11/1966 | Tashiro et al. | 106—39 |
| 3,384,508 | 5/1968 | Bopp et al. | 106—54 X |

OTHER REFERENCES
Kingery, W. D., Introduction To Ceramics, New York, John Wiley & Sons, 1960, pp. 624–625.

HELEN M. McCARTHY, Primary Examiner

W. R. SATTERFIELD, Assistant Examiner

U.S. Cl. X.R.

106—49, 52; 117—124